United States Patent [19]

Wang

[11] Patent Number: 5,678,489
[45] Date of Patent: Oct. 21, 1997

[54] ELECTRICALLY-OPERATED MOVING BODY TRAVELLING ON A RAIL CAPABLE OF EXPLAINING FREE QUADRANTS DESCRIBED IN THE MOBIUS THEOREM

[75] Inventor: Xian Wang, Changsha, China

[73] Assignees: Studio Eluceo Ltd., Taipei; Jya Cheng Enterprise Co. Ltd., Taipei Hsien, both of Taiwan

[21] Appl. No.: 676,732

[22] Filed: Jul. 8, 1996

[51] Int. Cl.$^6$ ................................ A63G 31/02
[52] U.S. Cl. ............... 104/56; 104/DIG. 1; 105/78; 238/10 E; 446/444
[58] Field of Search ................ 104/56, 63, 295, 104/DIG. 1, 53; 105/73, 78; 238/10 R, 10 E, 10 F; 446/444, 447

[56] References Cited

U.S. PATENT DOCUMENTS

| | | | |
|---|---|---|---|
| Re. 32,106 | 4/1986 | Lemelson | 238/10 E |
| 3,648,407 | 3/1972 | Pressman | 104/120 |
| 4,170,943 | 10/1979 | Achrekar | 104/75 |
| 4,632,038 | 12/1986 | Lawrence | 238/10 E |
| 4,940,444 | 7/1990 | Russell | 104/281 |
| 5,211,366 | 5/1993 | Cummings | 238/10 R |
| 5,456,410 | 10/1995 | Chow | 238/10 R |
| 5,529,241 | 6/1996 | Roder | 238/10 E |

*Primary Examiner*—S. Joseph Morano
*Attorney, Agent, or Firm*—Beveridge, DeGrandi, Weilacher & Young, L.L.P.

[57] ABSTRACT

Disclosed is an electrically-operated ornament travelling on a rail capable of explaining the free quadrants described in the Mobius Theorem. The ornament mainly includes a three-dimensional endless rail supported on a set of supports. The rail includes at least a twisted and turned part and a non-twisted part. Two parallel metal wires extend through a full length of the rail on both surfaces thereof. A controller is used to supply current to the metal wires and to control the magnitude and flowing direction of the supplied current. A moving body having rollers made of permanent magnetic material is magnetically attached to the metal wires. A transmission mechanism in the moving body is powered through the controller to drive the moving body to travel, back, or stop on the endless rail.

12 Claims, 9 Drawing Sheets

ELECTRICALLY-OPERATED MOVING BODY TRAVELLING ON A RAIL CAPABLE OF EXPLAINING FREE QUADRANTS DESCRIBED IN THE MOBIUS THEOREM

BACKGROUND OF THE INVENTION

1. Field of the Invention

The present invention relates to an electrically-controlled moving ornament travelling on a rail capable of explaining the Mobius Theorem, and more particularly to a moving ornament movable along a rail on either a top or a bottom surface thereof without falling down from the rail even when the ornament stops moving while it is located at a bottom surface of the rail.

2. Description of the Prior Art

The Mobius Theorem is a special mathematic theorem about the complex variable function. According to this theorem, a mapping of a circle to another circle may be done through a function conversion. In general textbooks, this advanced mathematic rule is usually explained by demonstrating a body circularly moving on a front and a reverse side of a twisted two-ends-connected belt. Most people can not understand and imagine the theorem from such explanation and demonstration.

There are presently a variety of commercially available toys with a moving body on a defined rail. Due to some problems in the structural design of these toys, the moving body of all these toys can only move on a top or front surface of the rail in a circular manner. When the moving body moves to a bottom or reverse surface of the rail, it will fall off from the rail due to the gravity. That is, these conventional rail toys fail to explain the Mobius Theorem in their design.

SUMMARY OF THE INVENTION

It is therefore a primary object of the present invention to provide an electrically-operated ornament travelling on a rail which can he used to explain the Mobius Theorem. The present invention includes a three-dimensional endless rail. A length of the rail twists and turns by 180 degrees. Both the top and bottom surfaces of the rail have two elongated metal wires parallelly extended along a full length of the rail. A controller is electrically connected to the metal wires. A moving body having rollers made of permanent magnetic material is magnetically attached to the elongated metal wires. A transmission unit in the moving body is powered when the rollers contact with the metal wires. One of the four rollers is a driving roller which is driven by the powered transmission unit to bring the moving body to travel, back, or stop on the endless rail in any quadrant defined by the path of the rail.

Another object of the present invention is to provide an electrically-operated ornament travelling on a rail in which a moving body can travel on a top and a bottom surfaces of the rail, forming a novel, interesting and educational ornament or toy.

2

DETAILED DESCRIPTION OF THE PREFERRED EMBODIMENTS

Figure 1:
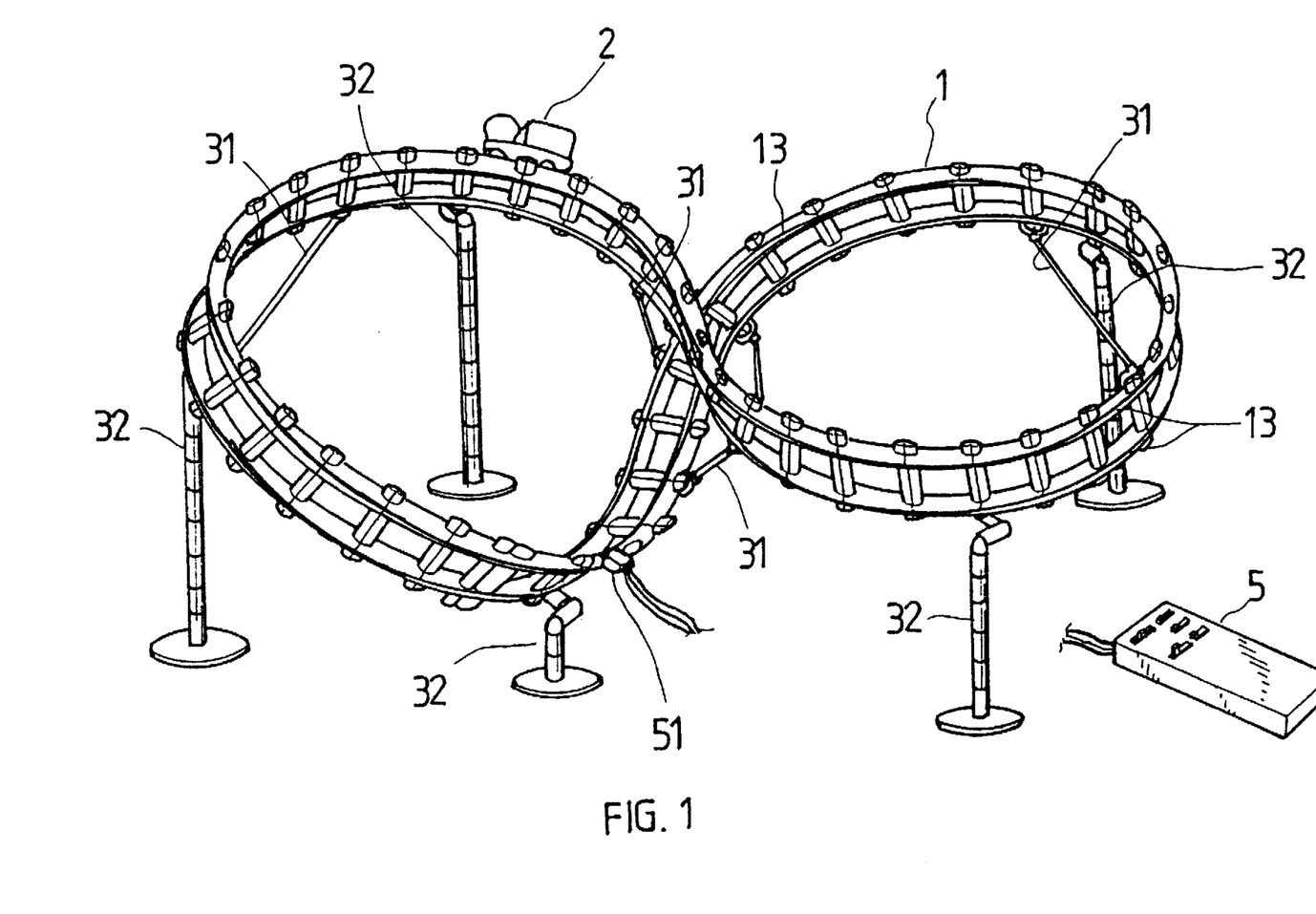
FIG. 1 is a perspective view showing a preferred embodiment of the present invention.

Please refer to FIG. 1 in which a preferred embodiment of the present invention is shown and mainly includes an endless rail 1 twisted near a middle point thereof to extend into different directions in a space, a moving body 2 travelling along the rail 1, a plurality of first supporting means 31, a plurality of second supporting means 32, and a controller 5.

Figure 2:
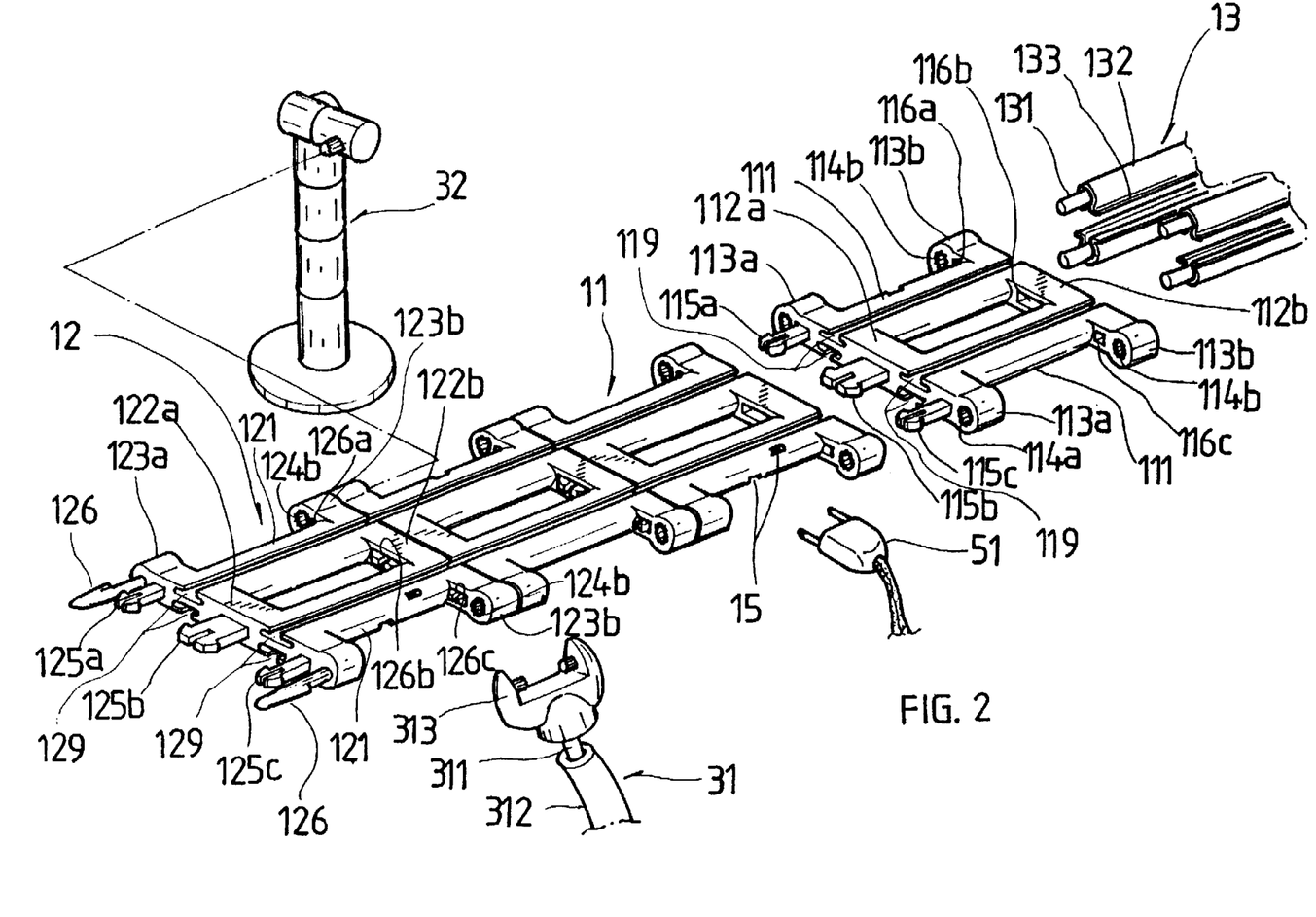
FIG. 2 is a fragmentary, exploded perspective of the embodiment in FIG. 1.

FIG. 2 is a fragmentary, exploded perspective of the preferred embodiment of the present invention, showing particularly a detailed structure of the rail 1. The rail 1 is assembled from a plurality of segments made of non-conductive plastic material. These rail segments are divided into two types, namely, a normal type 11 and a connecting type 12. The normal type rail segment 11 each includes two longitudinal rail portions 111, a front and a rear connecting portions 112a and 112b extending transversely to respectively connect two front ends and two rear ends of the rail portions 111. The front and the rear connecting portions 112a, 112b respectively have two ends 113a, 113b laterally projected from the front and the rear ends of the rail portions 111. The ends 113a, 113b are provided with through holes 114a, 114b, respectively. Three retaining means 115a, 115b, 115c forward project from a front surface of the front connecting portion 112a to detachably engage into three retaining holes 116a, 116b, 116c formed on a rear surface of the rear connecting portion 112b and thereby connect two rail segments 11 together in series.

The connecting type rail segment 12 each also includes two longitudinal rail portions 121, a front and a rear connecting portions 122a, 122b extending transversely to respectively connect two front ends and two rear ends of the rail portions 121. The front and the rear connecting portions 122a, 122b respectively have two ends 123a, 123b laterally projected from the front and the rear ends of the rail portions 121. The rear ends 123b are provided with through holes 124b respectively. Three retaining means 125a, 125b, 125c forward project from a front surface of the front connecting portion 122a to detachably engage into three retaining holes 126a, 126b, 126c formed on a rear surface of the rear connecting portion 122b and thereby connect two rail segments 11 and/or 12 together in series. The connecting rail segment 12 further has two engaging pins 126 forward projecting from two outer ends of the front surface thereof for securely engaging into the through holes 114b or 124b of the normal rail segment 11.

Figure 5:
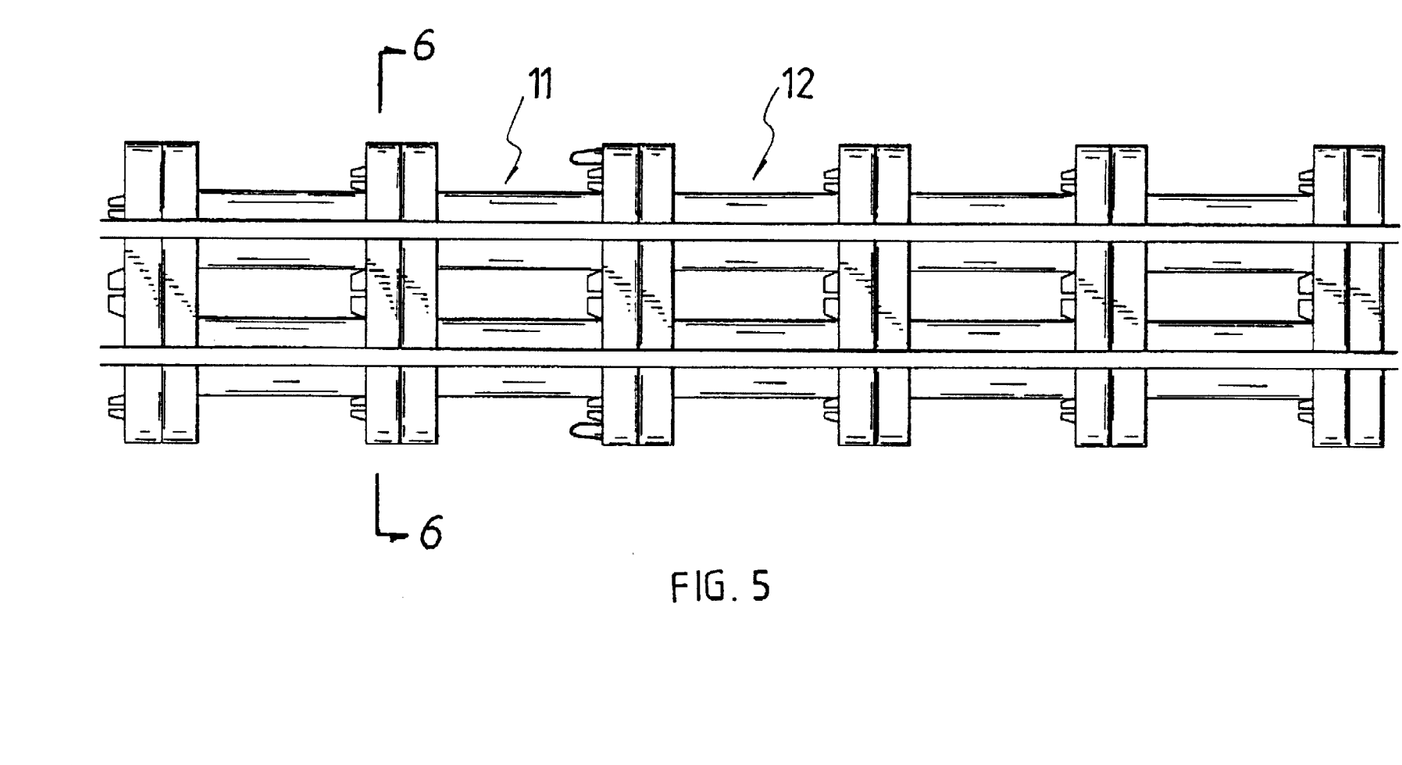
FIG. 5 is a top plan view showing a length of the rail of the preferred embodiment of the present invention.

FIG. 5 is a top plan view illustrating a length of connected rail segments 11 and/or 12 by engaging the retaining means 115, 125 into the retaining holes 116, 126, respectively.

Figure 6:
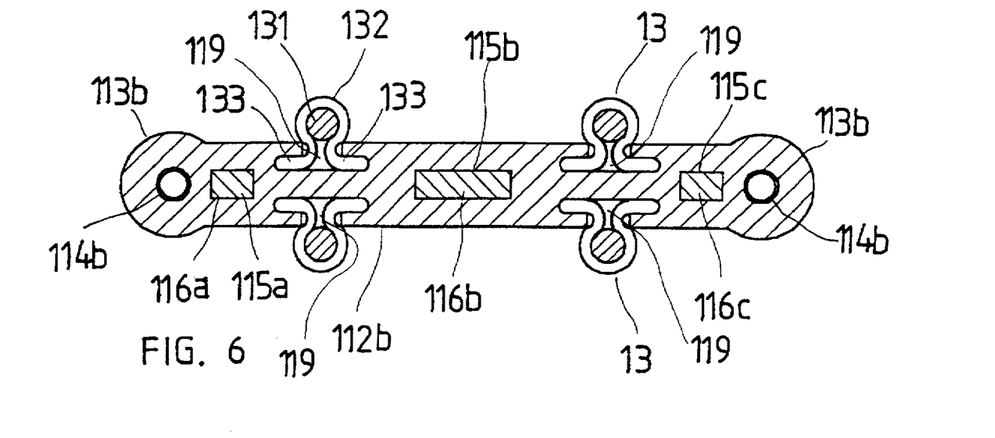
FIG. 6 is a cross sectional view taken along line 6—6 of FIG. 5.

Referring back to FIG. 2, both the rail segments 11 and 12 have two parallel retaining channels 119, 129 formed on a top and a bottom surface thereof to accommodate an elongated metal wire 13 therein, so that all the rail segments 11, 12 can be connected in series. FIG. 6 is a cross sectional view showing the manner in which the elongated metal wires 13 are received in the retaining channels 119, 129. The metal wire 13 each includes a metallic string 131 wrapped by a protective sheath 132 having a substantially reverse U-shaped cross section. The protective sheath 132 has two outward bent lateral sides 133 which are inserted into the retaining channel 119 or 129 so as to have the metal wire 13 firmly retained in the channel 119 or 129.

Figure 3:
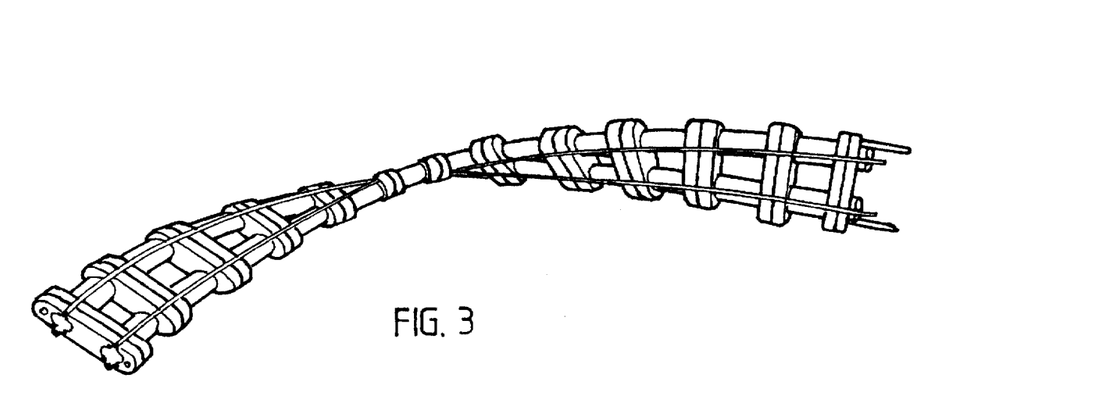
FIG. 3 is a perspective showing a length of the rail of the embodiment of FIG. 1 forming a twist and turn point of the rail.
Figure 4:
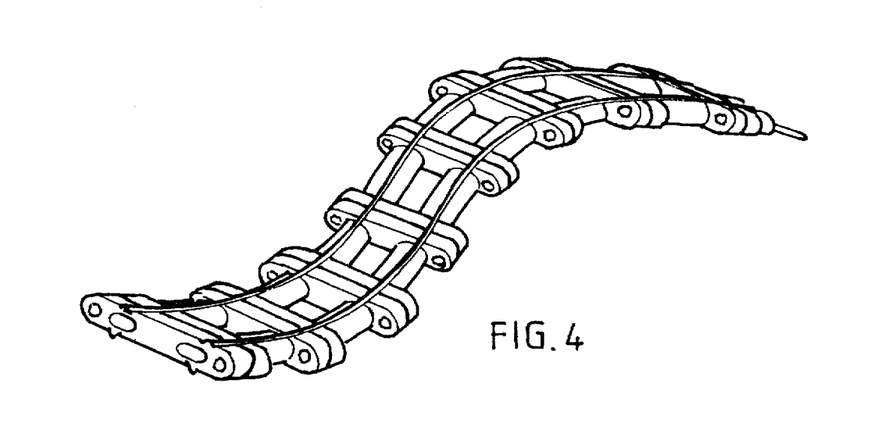
FIG. 4 is a perspective showing a lnegth of the rail of the embodiment of FIG. 1 forming the non-twist portion of the rail.

In assembling the rail segments 11, 12 to form the rail 1, substantially two connection forms can be empolyed. FIG. 3 illustrates a length of twisted rail wherein the serially connected rail segments are twisted and turned by 180 degrees at a certain point so that a part of the rail 1 to the right and another part to the left of the twist point have top surfaces facing oppositely. On the other hand, FIG. 4 illustrates a length of serially connected rail segments which extend straightly, curvilinearly or circularly but always keep their top surface facing upward. The elongated metal wires 13 extending through the connecting channels of the serially connected rail segments 11, permit the rail 1 to be curved and twisted and turned.

Please now refer back to FIGS. 1 and 2. The first supporting means 31 are used to interconnect two non-successive parts of the rail 1 which extend in differnt directions and/or in different planes. The first supporting means 31 each include a length of flexible metal wire 311 wrapped in a layer of plastic material 312 and two holding heads 313 connected to two ends of the metal wire 311. The holding head 313 is so designed that it can firmly engage with the through holes 114 or 124 on the plastic rail segment 11 or 12, thereby, non-successive parts of the rail 1 can be pushed apart and fixedly supported by the first supporting means 31 to extend in different directions and planes without becoming deformed, as shown in FIG. 1.

Figure 7:
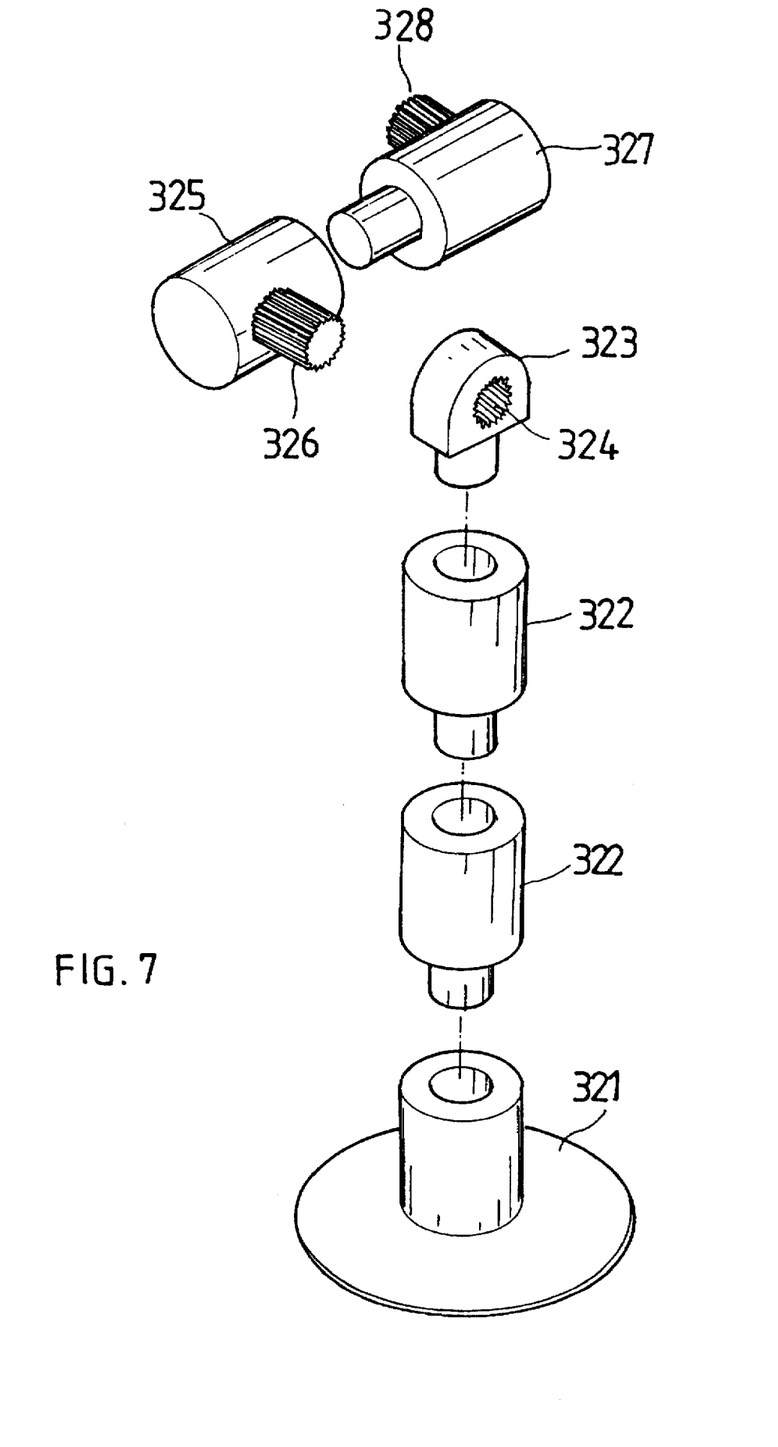
FIG. 7 is an exploded perspective view of the second support of the preferred embodiment of the present invention illustrated in FIG. 1.

The second supporting means 32 are used to support the three-dimensional rail 1 so that the rail 1 can stably stand on a plane. In addition, the second supporting means 32 must be so designed that it is permitted to engage with the through holes on the rail segments 11, 12 without being limited by the height and the extending direction of the rail 1. Please refer to FIG. 7 in which an exploded perspective of the second supporting means 32 is shown. The second support 32 includes a base member 321 capable of stably standing on a plane, a plurality of detachably connected short sections 322, a head member 323 having an internally toothed hole 324 formed thereat, a first connecting member 325 having an outward projected toothed rod 326, and a second connecting member 327 having an outward protected toothed rod 328. The toothed rod 326 of the first connecting member 325 is adjustably engaged into the toothed hole 324 of the head member 323. The toothed rod 328 of the second connecting member 327 is detachably engaged into the through hole 114 or 124 of the rail segment 11 or 12. With the teeth formed on the head member 323 and on the rods 326 and 328, and with unlimited numbers of the connecting sections 322, the second supporting means 32 may have an angularly freely adjustable top portion and a freely adjustable height to support the rail 1 at any position thereof.

Figures 8, 9:
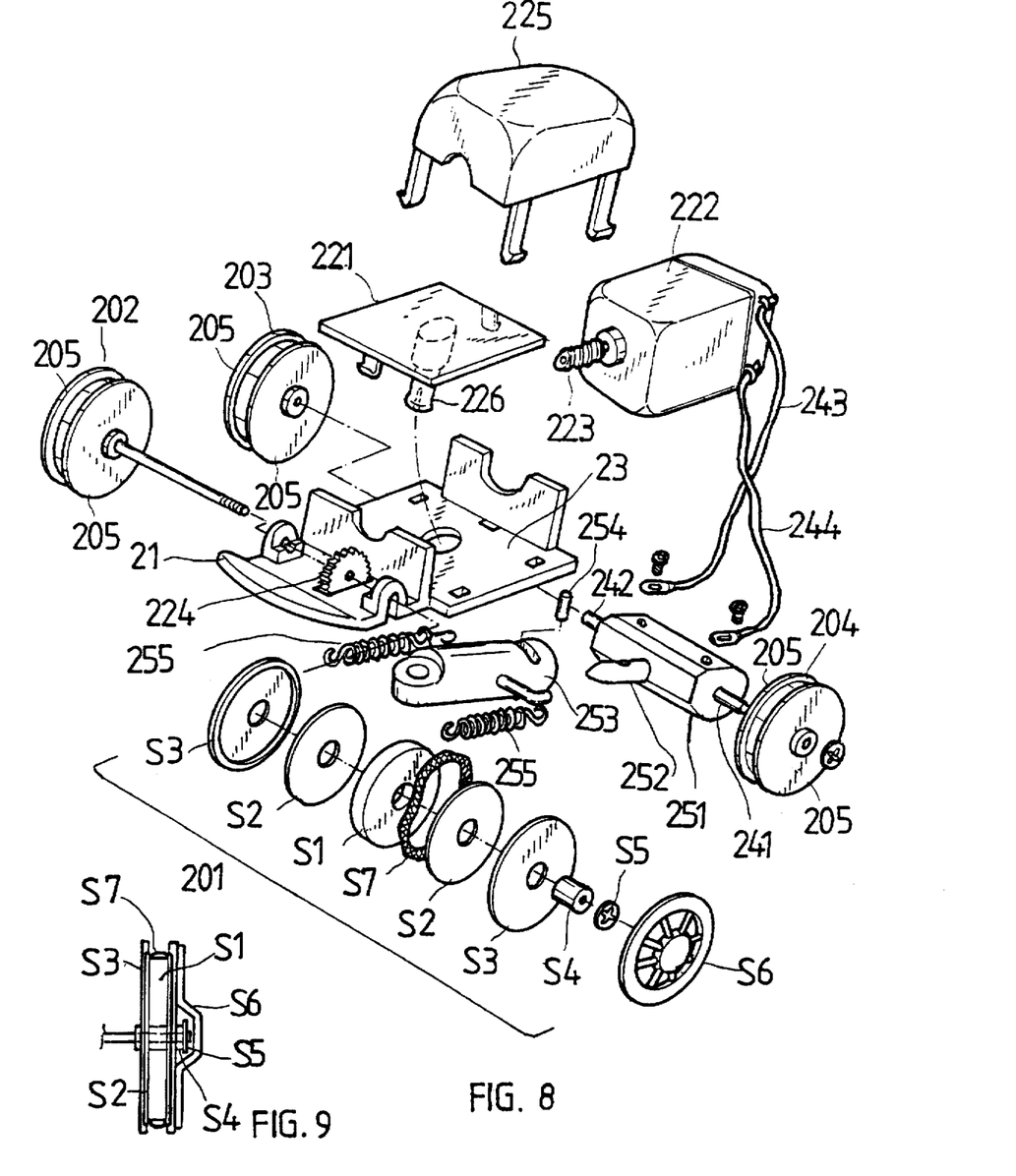
FIG. 8 is an exploded perspective view of the moving body of the preferred embodiment of the present invention.
FIG. 9 is a side elevational view of a roller of the moving body of FIG. 8.

The moving body 2 of the present invention is illustrated in FIG. 8. The moving body 2 includes a base 21 having four rollers 201, 202, 203, and 204 connected thereto. The rollers are made of permanent magnetic material and are divided into a front pair (201, 202) and a rear pair (203, 204). A distance between two rollers in a pair is substantially equal to the distance between the two parallel metal wires 13. Each roller includes two outer side disc members 205 with a larger diameter, so that the roller can roll along the metal wire 13. The roller 201 is a driving roller while the other three rollers 202, 203, 204 are idler rollers.

A transmission mechanism is mounted on the base 21 and includes a fixing plate 23, a connecting board 221 fixed onto the fixing plate 23, a motor 222 mounted on the connecting board 221, a worm 223 connected to a rotor of the motor 222, a gear 224 meshing with the worm 223, and a housing 225 covering over the motor 222. The gear 224 and the driving roller 201 are coaxial so that the roller 201 is driven to rotate by the gear 224. The rear rollers 203, 204 are attached to two shafts 242, 241, respectively, projected from two ends of a shaft holder 251. Two electric wires 243, 244 are connected at one end to the shafts 241, 242 and at the other end to the motor 222, so as to electrically connect the shafts 241, 242 to the motor 222. When the rear rollers 203, 204 are supplied with power by contacting with a positive and a negative electrodes on the rail 1, the power is sent to the motor 222 to actuate the same.

Figure 10:
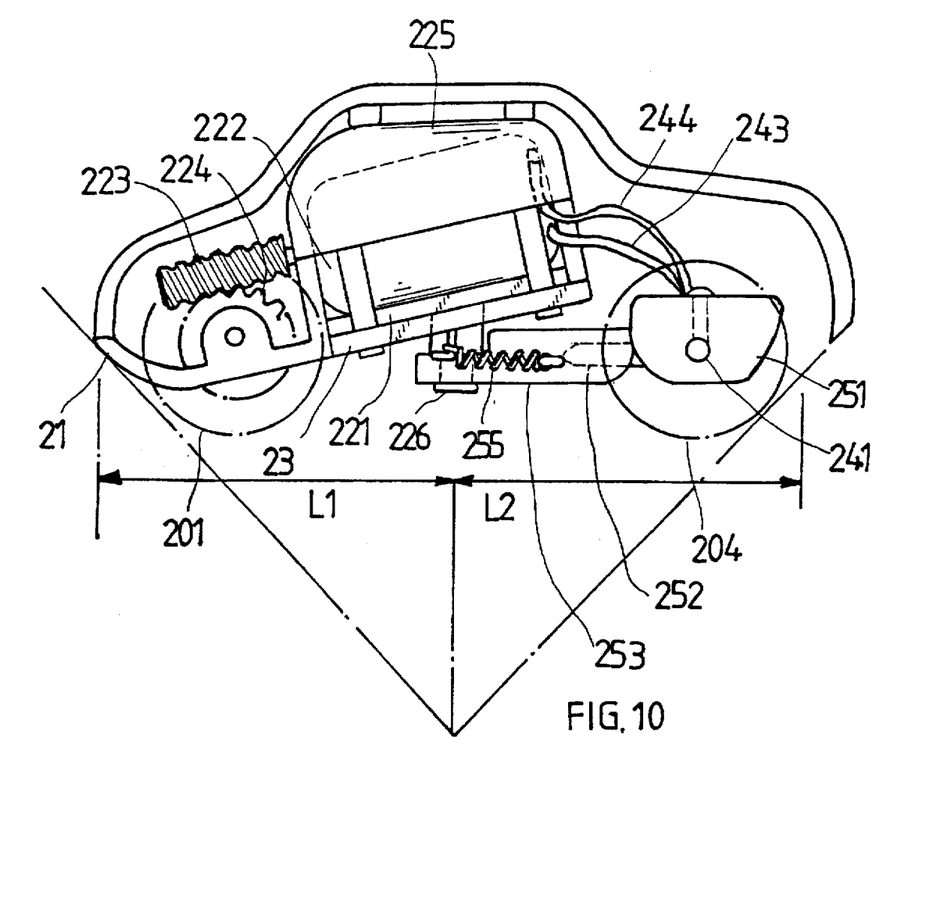
FIG. 10 is a side sectional view of the moving body of FIG. 8.

The shaft holder 251 has a front pin 252 forward projecting from a front surface thereof to insert into a rear end of a buffer member 253 and be fixedly connected thereto by means of a locating pin 254 vertically extending through the pin 252 and the buffer member 253. Two springs 255 are attached at one end to two sides of the buffer member 253 and at the other end to two hooks projected from a bottom surface of the fixing plate 23. The buffer member 253 has a front hole to receive a shaft member 226 downward projected from a bottom surface of the connecting board 221 in such a manner that the connecting board 221 is allowed to rotate relative to the buffer member 253. The shaft holder 251, the front projected pin 252, the buffer member 253, and the springs 255 together constitute a buffer mechanism which permits the two rear rollers 203, 204 to automatically adjust their heights in position when the moving body 2 passes the rail 1 through a part having a big curvature without disengaging from the rail 1. The connection of the front projected pin 252 to the buffer member 253 allows the rear rollers 203, 204 to swing on a levelled plane, while the attachment of the springs 255 to the buffer member 253 allows the rear rollers to adjust their height. As shown in FIG. 10, the point at where the shaft member 226 of the connecting board 221 connected to the buffer member 253 is preferably located at a center of the moving body 2. That is, distance L1 equals to distance L2 in FIG. 10. This allows the moving body to sway up or down and right or left to overcome curved parts in the rail 1 either with a big or a small curvature, keeping the rollers always in a position normal to the rail 1 without turning over from the rail 1.

The moving body 2 may also be designed to have only two or three rollers so that the buffer means can be omitted, because three points define a plane and allow the moving body 2 to travel along the rail 1 without falling off therefrom.

FIGS. 8 and 9 illustrate the structure of the driving roller 201. The roller 201 includes a permanent magnet S1, two steel plates S2 attached to two sides of the magnet S1 to enhance the magnetism, two plastic disks S3 for locating the magnet S1 and preventing the same from displacement, a copper shaft S3 extending through the plastic disks S4, the steel plates S2, and the permanent magnet S1, a stopper ring S5, a plastic protective housing S6, and a rubber band S7. The rubber band S7 is put around an outer periphery of the magnet S1 to increase a resistance thereof and to prevent the roller 201 from slipping. These arrangements shall intensify a magnetic field of the driving roller 201, permitting the roller 201 to bring other rollers 202, 203, 204 to move along with it.

The controller 5 has a plug 51 for plugging into socket holes 15 provided on the rail portions 111 or 121 of the plastic rail segments 11 or 12, so as to supply current to the metal wires 13. Current in the metal wires 13 further flows to the motor 222 inside the moving body via the two rear rollers 203, 204. A switch on the controller 5 is used to control the magnitude of current and flowing direction, so as to control the travelling, the backing, and the stopping of the moving body 2 on the rail 1.

Figure 11:
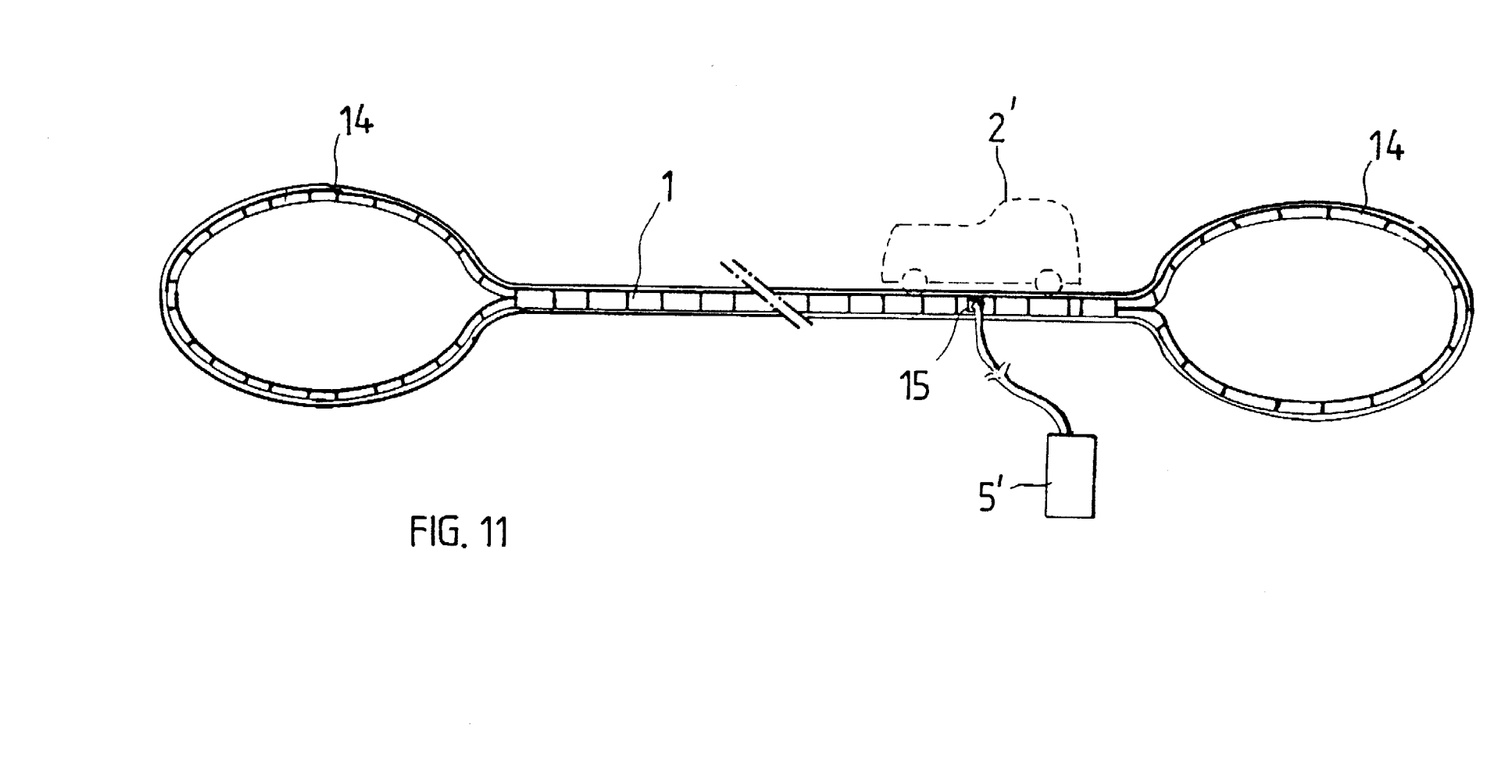
FIG. 11 is a side elevational view of another embodiment of the present invention.

FIG. 11 illustrates another embodiment of the present invention which has a rail 1' including a middle straight part and two looped parts 14 formed at two ends of the straight part. The looped rail parts 14 provide travel passing through different quadrants for a moving body 2'. Two parallel metal wires extend a full length of the straight part of the rail 1' on both a top and a bottom surface thereof but the looped part 14 on only an outer surface thereof. This design allows the moving body 2' to move along the rail 1' on a top side and a bottom side thereof in a circular manner under the operation of a controller 5'.

Figure 12:
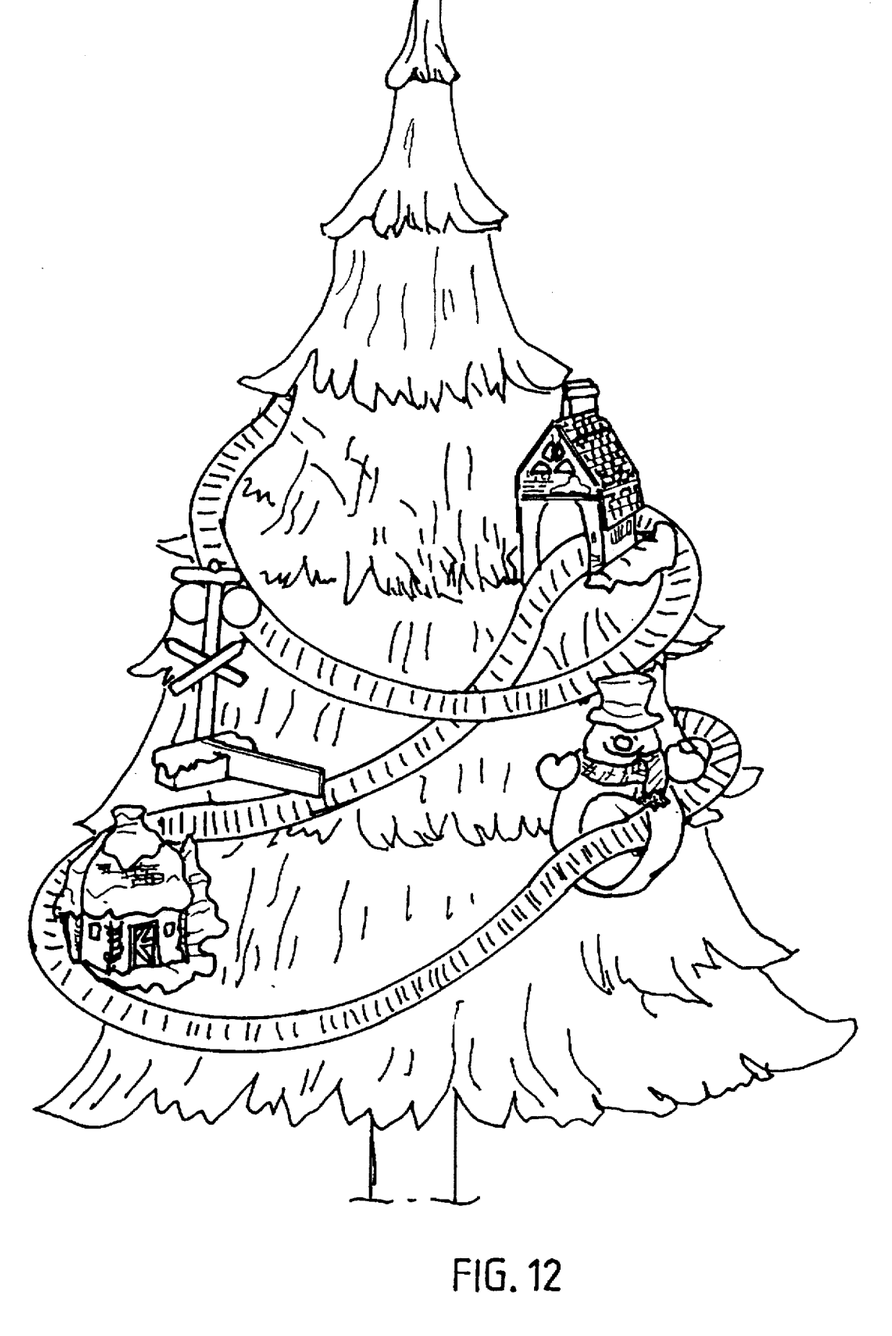
FIG. 12 illustrates another embodiment of the present invention being used to decorate a Christmas tree.

The present invention may, in addition to demonstrate the Mobius Theorem, also be used as an ornament to decorate Chirstmas tree, for example, providing a novel and very interesting effect as shown in FIG. 12.

The moving body may also he battery-powered and be remotely controlled by the controller to move forward or backward or to stop at any point on the rail.

What is claimed is:

1. An electrically-controlled ornament travelling on a rail, comprising:

a rail assembly made of non-conductive material, extending through different directions and defining an endless path in a three-dimensional space, said rail assembly including at least a twisted and turned section and a non-twisted section, a top and a bottom surface on both of which two parallel metal wires extend therethrough and project therefrom, and at least a socket hole from which current is supplied to said metal wires;

a plurality of supporting means for supporting said rail assembly on a plane and in a desired configuration;

a moving body having at least two rollers made of permanent magnetic material so that said rollers are magnetically attached to said metal wires on said rail assembly; at least one of said rollers being linked to a transmission mechanism, said transmission mechanism being powered by current flowing from said metal wires to said transmission mechanism via said at least one roller to drive said moving body to move or stop on said rail assembly; and a controller having an extended plug for plugging into said at least one socket hole on said rail assembly to supply power to said metal wires and accordingly said transmission mechanism for driving said moving body to travel, back or stop on said rail assembly under operation of said controller.

2. An ornament travelling on a rail as claimed in claim 1, wherein said three-dimensional rail assembly is formed from a plurality of serially connected plastic rail segments, said plastic rail segments each including at least two longitudinally extended rail portions and both front and rear connecting portions respectively connecting two front ends and two rear ends of said rail portions.

3. An ornament travelling On a rail as claimed in claim 2, wherein said front and said rear connecting portions have two ends laterally projected from said two rail portions and are provided with a through hole each for engaging with said supporting means.

4. An ornament travelling on a rail as claimed in claim 3, wherein said supporting means includes at least first and second types, said first supporting means being used to interconnect two non-successive parts of said rail assembly, and said second supporting means being used to connect with and support said rail assembly for same to stably stand on a plane.

5. An ornament travelling on a rail as claimed in claim 4, wherein said first supporting means comprises an elongated flexible metal material wrapped around by a layer of plastic material, said first supporting means including two holding heads formed at two ends of said elongated flexible metal material for engaging into said through holes on two laterally projected ends of said front and said rear connecting portions of said rail segments.

6. An ornament travelling on a rail as claimed in claim 4, wherein said second supporting means comprises a base member, a plurality of detachably and vertically connected short sections on said base member, and a direction-adjustable head member engaged at one end into a top of said connected short sections and at the other end into said through holes on said rail segments.

7. An ornament travelling on a rail as claimed in claim 1, wherein said rollers of said moving body each comprises a disk-shaped permanent magnet, and two disk-shaped members attached to two lateral outer sides of said permanent magnet; said outer disk-shaped members having a diameter larger than that of said permanent magnet, permitting said rollers to roll on said metal wires projected from said rail assembly.

8. An ornament travelling on a rail as claimed in claim 7, wherein said moving body comprises:

a base having a fixing plate extending therefrom for four pieces of said disk-shaped rollers to connected thereto, said four rollers being divided into a front pair and a rear pair, a distance between two said rollers in any of said front and said rear pairs being substantially equal to a distance between said two parallel metal wires on said rail segments; and said transmission mechanism mounted on said base and including a connecting board fixed onto said fixing plate, a motor mounted on said connecting board, a worm connected to a rotor of said motor, a gear meshing with said worm, and a housing covering over said motor; said gear and a driving roller among said four rollers being coaxial so that said driving roller is driven to rotate by said gear, said rear pair of rollers being attached to two roller shafts projected from two ends of a shaft holder, two electric wires being connected at one end to said roller shafts and at the other end to said motor, so as to electrically connect said roller shafts to said motor, so that power is supplied to said motor via said rear pair of rollers electrically connected to positive and negative electrodes on said rail assembly.

9. An ornament travelling on a rail as claimed in claim 8, wherein said moving body further includes a buffer mechanism which comprises a buffer member having a rear hole, a front pin forward projected from a front surface of said shaft holder to extend into said rear hole of said buffer member and be fixedly connected thereto by means of a locating pin vertically extending through said front pin and said buffer member, and two springs attached at one end to two sides of said buffer member and at the other end to two hooks projected from a bottom surface of said fixing plate; said buffer member has a front hole to receive a shaft member downward projected from a bottom surface of said connecting board in such a manner that said connecting board is allowed to rotate relative to said buffer member.

10. An ornament travelling on a rail as claimed in claim 8, wherein said driving roller of said moving body has a permant magnet having a magnetism stronger than that of the other rollers, said driving roller also having two steel plates provided to two sides of said permanent magnet to intensify said magnetism of said permanent magnet, and a rubber band put around a circumferential periphery of said permanent magnet to increase a friction thereof.

11. An ornament travelling on a rail as claimed in claim 1, wherein said elongated metal wires on said rail assembly each is a sheath-like metal material wrapped around by a protective sheath having a reverse U-shaped cross section, said protective sheath having two outward bent lateral edges which are inserted into retaining channels formed on said rail segments.

12. An ornament travelling on a rail, comprising:

a rail assembly made of non-conductive material and including a middle straight part and two looped parts formed at two ends of said straight part, said rail assembly having two parallel metal wires extend a full length of said straight part on both a top and a bottom surface thereof but said looped parts on only an outer surface thereof, and at least a socket hole from which current is supplied to said metal wires;

a plurality of supporting means for supporting said rail assembly on a plane and in a desired configuration;

a moving body having at least two rollers made of permanent magnetic material so that said rollers are magnetically attached to said metal wires on said rail assembly; at least one of said rollers being linked to a transmission mechanism, said transmission mechanism being powered by current flowing from said metal wires to said mechanism via said at least one roller to drive said moving body to move or stop on said rail assembly; and a controller having an extended plug for plugging into said at least one socket hole on said rail assembly to supply power to said metal wires and accordingly said transmission mechanism for driving said moving body to travel, back or stop on said rail assembly under operation of said controller.

* * * * *